United States Patent [19]

Crandley

[11] Patent Number: 5,611,501
[45] Date of Patent: Mar. 18, 1997

[54] AIRCRAFT WING PROTECTIVE COVER SYSTEM

[76] Inventor: William R. Crandley, P.O. Box 3514, Pagosa Springs, Colo. 81147

[21] Appl. No.: 410,110

[22] Filed: Mar. 24, 1995

[51] Int. Cl.$^6$ ....................................................... B64F 1/00
[52] U.S. Cl. ........................................... 244/1 R; 150/166
[58] Field of Search .................................. 244/1 R, 213, 244/123; 135/115; 150/164, 165, 166

[56] References Cited

U.S. PATENT DOCUMENTS

| | | | |
|---|---|---|---|
| 1,089,103 | 3/1914 | Barnard | 135/115 |
| 1,427,448 | 8/1922 | Dornier | 150/52 |
| 1,728,437 | 9/1929 | Matt | 150/166 |
| 2,453,403 | 11/1948 | Bogardus | 244/1 |
| 2,455,237 | 11/1948 | Davis | 150/154 |
| 2,609,164 | 9/1952 | Dillon | 244/1 |
| 2,714,386 | 8/1955 | Worsham | 135/115 |
| 2,723,811 | 11/1955 | Blomquist | 244/1 |
| 3,044,516 | 7/1962 | Stoll | 150/52 |
| 3,057,580 | 10/1962 | Hahn | 244/1 |
| 3,815,650 | 6/1974 | Hickey | 150/52 R |
| 4,598,883 | 7/1986 | Suter | 244/1 R |
| 4,606,516 | 8/1986 | Willison | 244/121 |
| 4,763,783 | 8/1988 | Talbot | 206/335 |
| 5,282,587 | 2/1994 | Rodyniuk et al. | 244/1 R |
| 5,340,055 | 8/1994 | Rodyniuk et al. | 244/1 R |

FOREIGN PATENT DOCUMENTS

| | | | |
|---|---|---|---|
| 1097825 | 1/1961 | Germany | 150/166 |
| 359041 | 3/1938 | Italy | 244/1 R |

*Primary Examiner*—Galen L. Barefoot
*Attorney, Agent, or Firm*—John R. Flanagan

[57] ABSTRACT

An aircraft wing protective cover system which is secured on an aircraft wing to cover and protect the wing from snow and ice build-up during winter weather includes a cover sheet configured to overlie the upper surface of an aircraft wing and to extend around and under the forward edge of the wing. The system also includes a pocket formed at an outer end of the cover sheet which encloses a tip of the wing, and perimeter strips attached to and extending along the perimeter of the cover sheet and cross strips attached to the cover sheet and extending between the perimeter strips to reinforce the cover sheet. The system further includes wing straps with attachment elements that extend from the perimeter strips at selected locations and are attached to one another underneath the wing to secure the cover against the upper surface of the wing, and fuselage straps with attachment elements that extend from the perimeter strips at the fore and aft inner corners of the cover sheet and are attached to fuselage straps that extend from another cover sheet on the opposite side of the aircraft to secure the inner edge of the cover sheet against the fuselage of the aircraft. Also, the system include clips attached to the cross strips near the aft edge of the cover sheet and which extend around the aft edge of the aircraft wing to prevent the cover sheet from sliding forward on the aircraft wing as the wing straps are tightened.

18 Claims, 2 Drawing Sheets

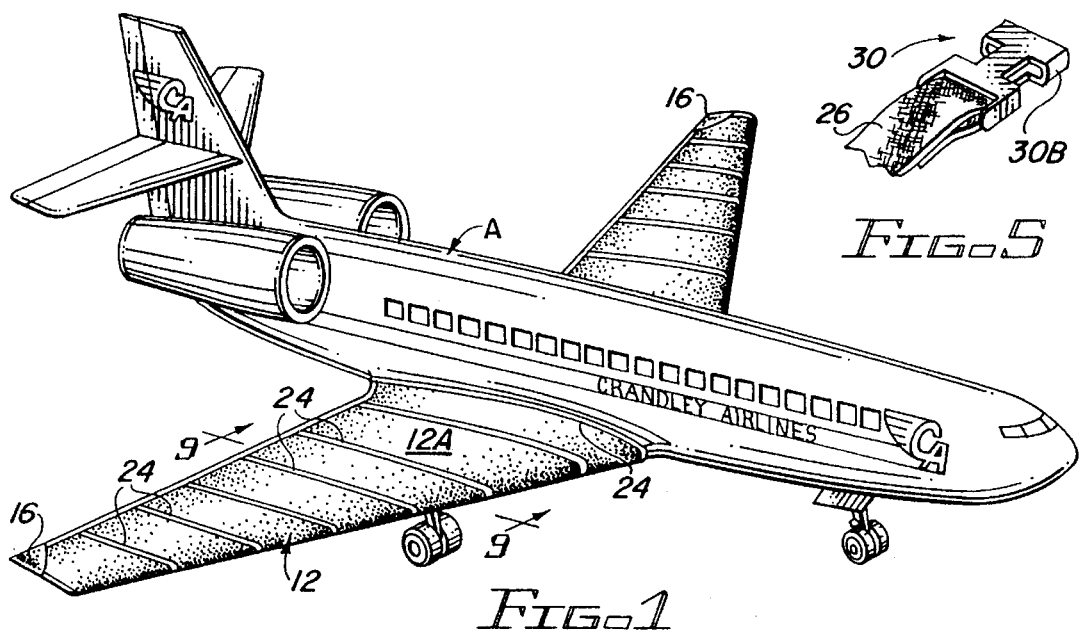
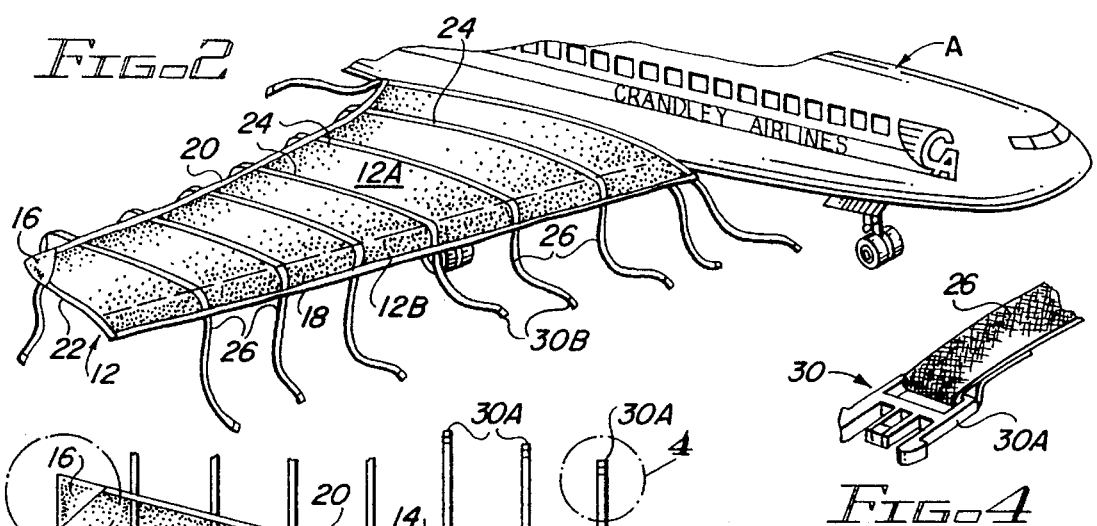
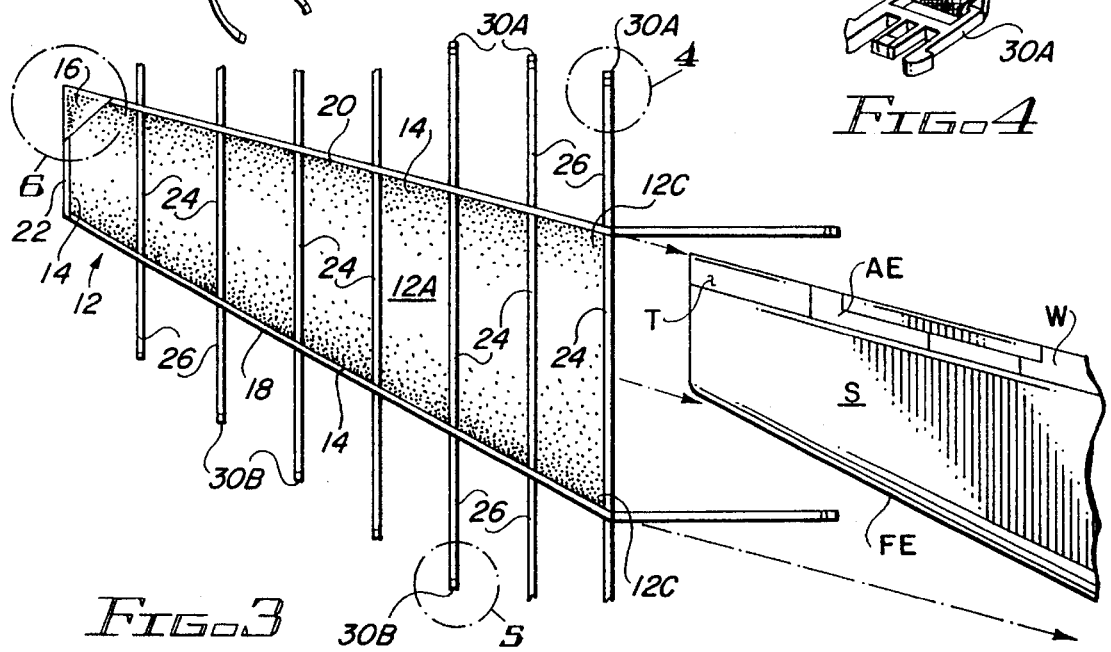

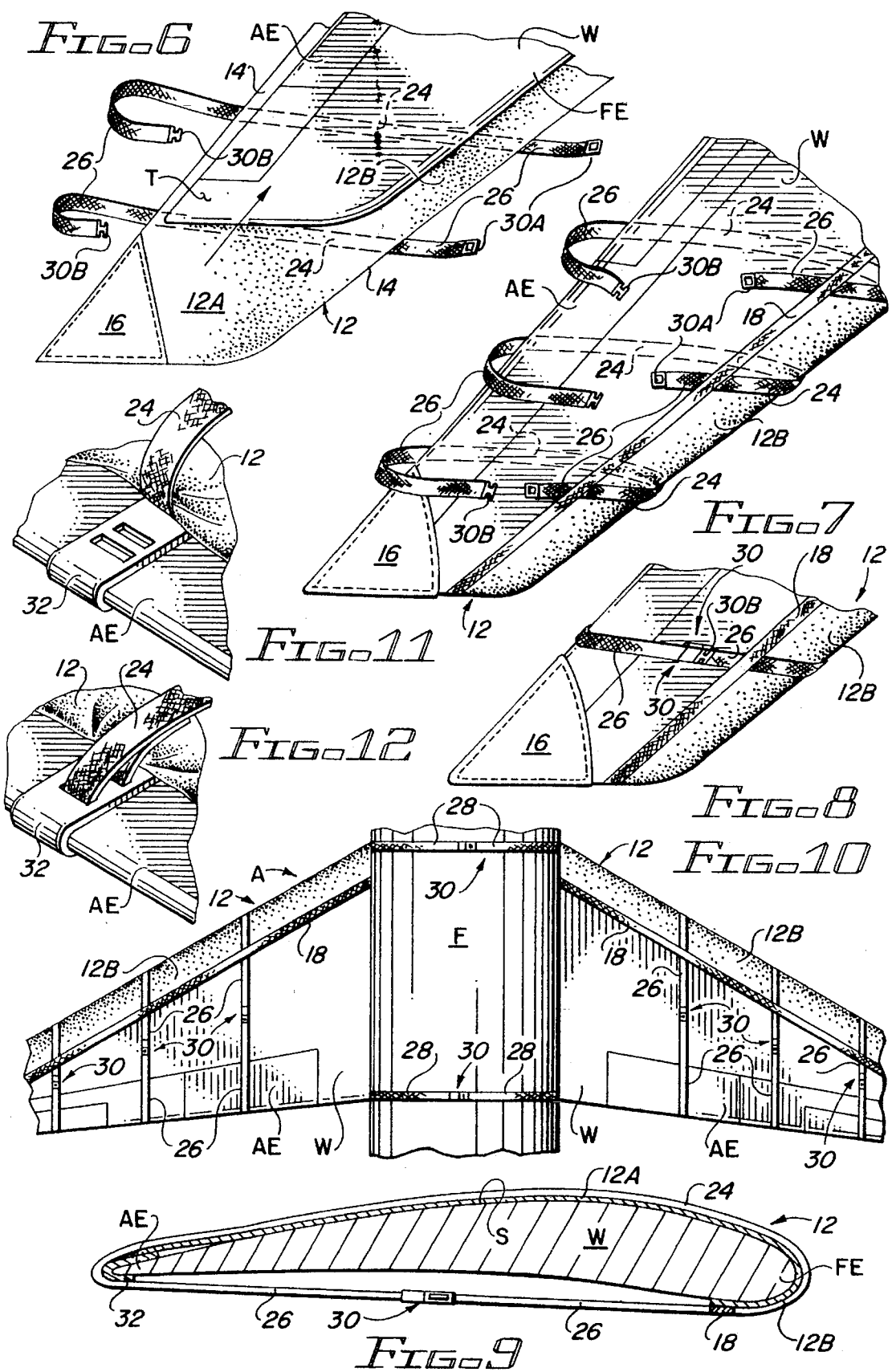

AIRCRAFT WING PROTECTIVE COVER SYSTEM

BACKGROUND OF THE INVENTION

1. Field of the Invention

The present invention generally relates to a protective apparatus for a variety of aircraft surfaces and, more particularly, is concerned with an aircraft wing protective cover system.

2. Description of the Prior Art

Private and corporate operations of small aircraft are increasingly common practices in today's society. The prevalence of such aircraft often greatly exceeds the hangar space available for them at many airports. Consequently, such aircraft are typically parked in the open air, without the benefit of a hangar, and are forced to endure the many hazards posed by a variety of inclement weather conditions. In addition to severe winds and hailstorms, the ice and snow brought by winter weather are sources of potential harm to an aircraft parked outside. Aircraft wings and stabilizer portions are particularly vulnerable to ice and snow build-up during winter weather. Because of this, expensive time-consuming de-icing procedures are often required to prepare aircraft for flight after snow and ice storms. Such de-icing procedures present a severe economic hardship to aircraft owners and operators.

A variety of arrangements have been proposed in the prior patent art for providing protection to portions of aircraft particularly susceptible to snow and ice build-up during winter weather. Several such arrangements include removable protective covers and means for securing the covers in place on aircraft wings. The covers reduce the need for expensive time-consuming de-icing procedures by providing a barrier between the surface of the aircraft wing and snow or ice. Examples of such protective cover arrangements are disclosed in U.S. Pat. No. 1,427,448 to Dornier, U.S. Pat. No. 2,453,403 to Bogardus, and U.S. Pat. No. 3,044,516 to Stoll.

The Dornier arrangement includes a pair of detachable roll-up wing coverings that are configured for matching the dimensions of each aircraft wing. The coverings are rolled outwardly from opposite sides of the aircraft fuselage for fitting over the upper wing surfaces and about the opposite wing tips and then rolled inwardly for resting along the lower wing surfaces. Each covering is fastened to each wing by eyes spaced along the longitudinal edges of the cover that receive small studs disposed along respective edges of the wing. The coverings are attached to one another beneath the fuselage.

The Bogardus arrangement includes a wing cover for overlying the upper surface of an aircraft wing from a location near the fuselage outwardly to the wing tip. The cover has a pocket which fits over and receives the wing tip. The leading and trailing edges of the cover extend over and around the leading and trailing edges of the wing and are secured to one another by a plurality of cords extending beneath each wing.

The Stoll arrangement includes a pair of protective wing coverings which can be folded into a bundle when not in use and unfolded for overlying the upper surface of a pair of aircraft wings. Each cover has an envelope-like receptacle for enclosing each wing tip and front and rear overlap portions for encompassing the leading and trailing edges of the wings. Quick connect and disconnect devices are disposed on the respective overlap portions, being attachable together beneath each aircraft wing for securing each protective covering on each wing.

A removable cover such as those included in each of the above described arrangements provides a lightweight and effective means for preventing snow and ice build-up on aircraft wings during winter weather. However, winter storms are often accompanied by strong winds which can both stretch and tear lightweight aircraft wing covers that are not sturdy enough and loosen or remove covers that are not reliably secured on the aircraft. None of the above described arrangements appear to include features for reinforcing the material of the cover to prevent undue stretching and tearing of the cover when strong winds blow. Additionally, none of the above described arrangements appear to provide anchoring features of sufficient strength for reliably securing portions of the cover closely with corresponding portions of the wing to prevent loosening or removal of the cover caused by severe wind pressure.

Consequently, a need still exists for an aircraft wing protective cover system which reduces the need for expensive time-consuming de-icing procedures by providing a barrier that prevents snow and ice build-up on aircraft wings during winter weather and includes reinforcement features for strengthening the material of the cover as well as efficient and effective anchoring and securement features.

SUMMARY OF THE INVENTION

The present invention provides an aircraft wing protective cover system designed to satisfy the aforementioned needs by avoiding the drawbacks of the prior art without introducing other drawbacks. The aircraft wing protective cover system of the present invention basically comprises: (a) a cover sheet having a perimeter and being made of a flexible, tear-resistant, moisture-proof material, the cover sheet having a main portion adapted to extend over a top surface of a wing of an aircraft and a front marginal portion extending forwardly from the main portion and adapted to extend around and under a forward edge of the aircraft wing; (b) a plurality of elongated perimeter strips made of a flexible inelastic material and attached to and extending along the perimeter of the cover sheet; (c) a plurality of elongated cross strips made of a flexible inelastic material and attached to the cover sheet, the cross strips being spaced apart from one another and extending between the forward edge and an aft edge of the aircraft wing and attached to the perimeter strips such that the perimeter strips and cross strips together reinforce the respective cover sheet so as to prevent stretching and tearing of the material thereof; and (d) means for connecting the cover sheet to the aircraft wing.

The protective cover system also includes a pocket formed at one end of the cover sheet, the pocket being adapted to extend over and enclose a tip of the aircraft wing. The protective cover system further includes a plurality of clips each attached to one of the cross strips and being shaped to extend around the aft edge of the aircraft wing to anchor an aft edge of the cover sheet at the aft edge of the aircraft wing.

More particularly, the connecting means of the system includes a plurality of fuselage straps connected at the corners of cover sheet which abut a fuselage of the aircraft and being adapted to extend thereunder, the fuselage straps having attachment means for securing the fuselage straps of one cover sheet covering one wing of the aircraft to the fuselage straps of the other cover sheet covering the wing on the opposite side of the aircraft. The connecting means also includes a plurality of wing straps connected at selected locations along the perimeter of the cover sheet to the perimeter strips and extending therefrom, the wing straps having attachment means for securing the cover sheet via the wing straps to portions of the aircraft wing. Further, the attachment means of the fuselage and wing straps includes a plurality of quick-release buckles attached thereto.

One feature of the present invention is that it prevents snow and ice build-up on the aircraft wing which it covers. The cover sheet has a configuration which matches that of the aircraft wing which it is intended to cover and protect. When the protective cover system is used, the cover sheet is placed over the upper surface of the wing so that the pocket at the outer end encloses the wing tip and the inner end of the cover sheet abuts the fuselage of the aircraft. The fore and aft edges of the cover sheet wrap around the fore and aft edges of the aircraft wing. The wing straps which extend from the aft edge of the cover sheet are attached to complementary wing straps which extend from the fore edge of the cover sheet and tightened to secure the cover sheet on the upper surface of the air craft wing. The fuselage straps are attached to fuselage straps extending from another cover sheet on the opposite wing of the aircraft to hold the cover sheet tightly against the fuselage of the aircraft. Thus, the upper surface of the aircraft wing is substantially covered by the cover sheet and any accumulated snow or ice is simply removed from the aircraft wing by removing the cover sheet.

A second feature of the present invention is the reinforcement straps provided for strengthening the material of the wing cover so as to enhance its durability over time. The perimeter strips reinforce the edge of the cover sheet and the cross strips which extend between the perimeter strips reinforce the main portion of the cover sheet. The perimeter and cross strips prevent stretching and tearing of the cover sheet that might occur while it is being installed on an aircraft wing, stretching and tearing of the cover sheet that might be caused by strong winds while it is on an aircraft wing, and stretching and tearing of the cover sheet when it is removed with a heavy accumulation of snow or ice. Preventing stretching and tearing of the cover sheet maintains its shape and ability to tightly fit on the aircraft wing.

An additional feature of the present invention are a plurality of clips which are attached to the cross strips near the aft edge of the cover sheet. The clips extend around the aft edge of the aircraft wing on which the cover is installed. The clips prevent the cover sheet from sliding forward on the aircraft wing as the wing straps are tightened. This makes it simpler to properly and tightly secure the cover sheet on the aircraft wing thereby preventing movement of the cover sheet and maintaining the cover sheet in proper position on the wing regardless of the extent of wind pressure on the cover or the onslaught of freezing rain, snow and ice.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a top perspective view showing an aircraft wing protective cover system of the present invention secured on each wing of an aircraft.

FIG. 2 is a top perspective view showing the aircraft wing protective cover system placed over the aircraft wing before it is secured.

FIG. 3 is a top plan view showing the cover sheet, pocket, perimeter strips, cross strips, wing straps with attachment means and fuselage straps with attachment means of the aircraft wing protective cover system aligned with the aircraft wing onto which the system is to be secured.

FIG. 4 is an enlarged perspective detailed view of the portion of the attachment means of the system that is encompassed by circle 4 in FIG. 3.

FIG. 5 is an enlarged perspective detailed view of the portion of the attachment means of the system that is encompassed by circle 5 in FIG. 3.

FIG. 6 is a fragmentarly bottom perspective view showing the outer portion of the cover sheet, the pocket and two wing straps of the aircraft wing protective cover system being placed on the aircraft wing.

FIG. 7 is a fragmentary bottom perspective view of the aircraft wing protective cover system immediately prior to attaching the wing straps to one another.

FIG. 8 is a fragmentary bottom perspective view showing the tip of the aircraft wing enclosed by the pocket and one wing strap extending from the aft edge of the cover sheet attached to one wing strap extending from the fore edge of the cover sheet.

FIG. 9 is a cross-sectional view of the aircraft wing protective cover system and an aircraft wing taken along line 9—9 in FIG. 1.

FIG. 10 is a bottom plan view of one aircraft wing protective cover system secured to another by the fuselage straps that extend under the fuselage of the aircraft.

FIG. 11 is a top perspective view showing one clip of the aircraft wing protective cover system extending around the aft edge of the aircraft wing and prior to securement of one of the cross strips thereto.

FIG. 12 is a top perspective view showing the one clip of the aircraft wing protective cover system extending around the aft edge of theaircraft wing and after securement of the one of the cross strips thereto.

DETAILED DESCRIPTION OF THE INVENTION

Referring to the drawings and particularly to FIGS. 1 to 3, there is illustrated an aircraft wing protective cover system, generally designated 10, of the present invention. The protective cover system 10 is adapted to be removably secured on a pair of wings W of any conventional aircraft A. The wings W are attached to and extend in generally opposite directions from the fuselage F of the aircraft A. The protective cover system 10 functions to cover and protect the wings W from a variety of inclement weather conditions, such as snow and ice build-up on the aircraft wing W.

Referring to FIGS. 1–3 and 6–10, the protective cover system 10 basically includes at least one and preferably a pair of cover sheets 12. Each cover sheet 12 basically has a configuration matching that of the respective one of the wings W which it is intended to cover and protect. Each cover sheet 12 has an outer perimeter 14 and is made of a flexible, tear-resistant, moisture-proof material, for example, a urethane coated polyester material. Also, each cover sheet 12 has a main portion 12A and a front marginal portion 12B extending forwardly from the main portion 12A. The main portion 12A of the cover sheet 12 is adapted to extend over and cover an entire top surface S of the respective aircraft wing W. The front marginal portion 12B is adapted to extend around and under an entire forward edge FE of the respective aircraft wing W.

Also, preferably, as seen in FIGS. 1–3 and 6–8, the protective cover system 10 includes a pocket 16 formed at the outer tip end of the cover sheet 12. The pocket 16 is adapted to extend over and enclose an outer tip T of the aircraft wing W.

Referring to FIGS. 1–3 and 7–10, the protective cover system 10 further includes a plurality of elongated fore, aft and outer end perimeter strips 18, 20, 22 and a plurality of elongated cross strips 24. Both the perimeter strips 18, 20, 22 and the cross strips 24 are made of a flexible inelastic material. The plurality of fore, aft and outer end perimeter strips 18, 20, 22 are attached to and extend along the outer perimeter 14 of the respective cover sheet 12. The plurality of elongated cross strips 24 are attached to the cover sheet 12 and laterally spaced apart from one another along the length of the respective wing W. The cross strips 24 extend between the forward edge FE and an aft edge AE of the wing W and are attached to the fore and aft perimeter strips 18, 20 such that the perimeter strips 18, 20, 22 and cross strips 24 together reinforce the cover sheet 12 so as to prevent stretching and tearing of the material thereof. The innermost one of the cross strips 24 will also serves as the inner end perimeter strip.

Referring to FIGS. 2–10, the protective cover system 10 further includes means for connecting each of the cover sheets 12 to the aircraft wing. Preferably, the connecting means takes the form of a plurality of elongated wing straps 26 and a plurality of elongated fuselage straps 28. The wing straps 26 are connected at selected locations along the outer perimeter 14 of each cover sheet 12 to the fore and aft perimeter strips 18, 20 and extend therefrom. The wing straps 26 have attachment means 30 for releasably securing the cover sheets 12 via the wing straps 26 to the aircraft wings W by extending the wing straps 26 under the wings W and between the forward and aft edges FE, AE thereof.

The fuselage straps 28 are connected at the inner corners 12C of the cover sheets 12 which are disposed adjacent to or abut the fuselage F of the aircraft A. The fuselage straps 28 extend therefrom under the aircraft fuselage F and have attachment means for securing the fuselage straps 28 of one cover sheet 12 of the system 10 covering the one wing W on one side of the aircraft A to the fuselage straps 28 of the other cover sheet 12 of the system 10 covering the wing W on the opposite side of the aircraft A. The perimeter strips 18, 20, 22, cross strips 24, wing straps 26 and fuselage straps 28 are preferably made from an inelastic nylon webbing material of relatively high strength.

As illustrated in FIGS. 4 and 5, the attachment means of the wing and fuselage straps 26, 28 take any suitable form. One preferred form is a plurality of quick-release buckles 30 attached to the free ends of the wing straps 26 and fuselage straps 28. More particularly, as seen in FIGS. 4 and 6–8, a male portion 30A of the quick-release buckle 30 is attached to the free end of each of the wing straps 26 that extends from the aft perimeter strip 20 along the aft edge of the cover sheet 12. As seen in FIGS. 5 and 6–8, a female portion 30B of the quick-release buckle 30 that complements, receives and releasably attaches to the male portion 30A of the quick-release buckle 30 is attached to the free end of each of the wing straps 26 that extend from the fore perimeter strip 18 along the fore edge of the cover sheet 12. The respective wing straps 26 can be adjustably tightened or loosened in a known manner at the female portions 30B thereof. Quick-release buckles 30 having the same design and components are also attached to the fuselage straps 28.

Referring now to FIGS. 6 to 10, to secure the system 10 on an airplane wing W, each cover sheet 12 is placed over a respective wing W so that its main portion 12A covers the upper surface S of the wing W, its front marginal portion 12B extends around and under the forward edge FE of the wing W, and its pocket 16 extends over and encloses the outer tip T of the wing W. The wing straps 26 that extend from the aft perimeter strip 20 along the aft edge of the cover sheet 12 are then pulled forward underneath the wing W and attached by means of the quick-release buckles 30 to the wing straps 26 that extend from the fore perimeter strip 18 along the fore edge of the cover sheet 12 which have been pulled rearwardly underneath the wing W. The wing straps 26 are then tightened until the main portion 12A of the cover sheet 12 becomes tightly secured against the upper surface S of the wing W and the forward marginal portion 12B becomes tightly secured about the fore edge FE of the wing W. The fuselage straps 28 are then pulled underneath the fuselage F of the aircraft A and are attached by means of the buckles 30 to fuselage straps 28 that extend from the other protective cover system 10 secured on the opposite wing W of the aircraft A. The fuselage straps 22 are then tightened to secure the inner edges of the cover sheet 12 tightly against the fuselage F. The pockets 16 retain the outer ends of the cover sheets 12 at the outer ends of the wings W so as to assist in tightly securing the main portion 12A against the top surface S of the wing W.

Referring now to FIGS. 11 and 12, preferably, the protective cover system 10 further includes a plurality of J-shaped attachment clips 32. Each clip 32 is separate from the respective cover sheet 12 and is attached to the aft end of one of the cross strips 24. The J shape of each attachment clip 32 adapts it to extend around and engage with the aft edge AE of the aircraft wing W to anchor an aft edge of the respective cover sheet 12 at the aft edge AE of the aircraft wing W. When the system 10 is being installed on a wing W, the clips 32 prevent the cover sheet 12 from sliding forward as the wing straps 26 are pulled tight. This makes it simpler to properly and tightly secure the cover sheet 12 on the wing W since the aft edge of the cover sheet 12 is held stationary as the wing straps 26 that extend from the fore perimeter strip 18 along the fore edge of the cover sheet 12 are pulled rearward and tightened.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. An aircraft wing protective cover system for securing on a wing of an aircraft to cover and protect the aircraft wing, said system comprising:

(a) a cover sheet having a perimeter and being made of a flexible, tear-resistant, moisture-proof material, said cover sheet having a main portion adapted to extend over a top surface of a wing of an aircraft and a front marginal portion extending forwardly from the main portion and adapted to extend around and under a forward edge of the aircraft wing;

(b) a plurality of elongated perimeter strips made of a flexible inelastic material and attached to and extending along said perimeter of said cover sheet;

(c) a plurality of elongated cross strips made of a flexible inelastic material and attached to said cover sheet, said cross strips being spaced apart from one another and extending between the forward edge and an aft edge of the wing and attached to said perimeter strips such that said perimeter strips and cross strips together reinforce said cover sheet so as to prevent stretching and tearing of said material thereof;

(d) means for connecting said cover sheet to the aircraft wing; and (e) a plurality of attachment clips each separate from said cover sheet and attached to one of said cross strips, each of said attachment clips being shaped to extend around and engage with the aft edge of the aircraft wing to anchor an aft edge of said cover sheet at the aft edge of the aircraft wing so as to prevent said cover sheet from sliding forward on the aircraft wing.

2. The system of claim 1 further comprising:

(e) a pocket formed at one end of said cover sheet, said pocket being adapted to extend over and enclose a tip of the aircraft wing.

3. The system of claim 1 further comprising:

(e) a plurality of fuselage straps connected at corners of said cover sheet which abut a fuselage of the aircraft and adapted to extend thereunder, said fuselage straps having attachment means for securing said fuselage straps to fuselage straps of another aircraft wing protective cover system secured on a wing on the opposite side of the aircraft.

4. The system of claim 3 wherein said fuselage straps are made from a nylon webbing material.

5. The system of claim 3 wherein said attachment means of said fuselage straps includes a plurality of quick-release buckles attached thereto.

6. The system of claim 1 wherein said clips are fabricated from rubber coated aluminum material.

7. The system of claim 1 wherein said connecting means includes a plurality of wing straps connected at selected locations along said perimeter of said cover sheet to said perimeter strips and extending therefrom, said wing straps having attachments means for securing said cover sheet via said wing straps to portions of said aircraft wing.

8. The system of claim 7 wherein said attachment means of said wing straps includes a plurality of quick-release buckles attached thereto.

9. The system of claim 7 wherein said wing straps are made from a nylon webbing material.

10. The system of claim 1 wherein said cover sheet is made from a urethane coated polyester material.

11. The system of claim 1 wherein said perimeter strips and said cross strips are made from a nylon webbing material.

12. In combination with an aircraft having a fuselage and a pair of wings attached to and extending outwardly in generally opposite directions from said fuselage, an aircraft wing protective cover system for securing on said wings of said aircraft to cover and protect said aircraft wings, said system comprising:

(a) a pair of cover sheets each having a perimeter and being made of a flexible, tear-resistant, moisture-proof material, said each cover sheet having a main portion adapted to extend over a top surface of a respective one of said aircraft wings and a front marginal portion extending forwardly from said main portion and adapted to extend around and under an entire forward edge of said respective one aircraft wing;

(b) a plurality of elongated perimeter strips made of a flexible inelastic material and attached to and extending along said perimeter of each of said cover sheets;

(c) a plurality of elongated cross strips made of a flexible inelastic material and attached to each of said cover sheet, said cross strips being spaced apart from one another and extending between the forward edge and an aft edge of said respective one aircraft wing and attached to said perimeter strips such that said perimeter strips and cross strips together reinforce said respective cover sheet so as to prevent stretching and tearing of said material thereof;

(d) means for connecting each of said cover sheets to a respective one of said aircraft wings and to one another; and (e) a plurality of attachment clips each separate from said cover sheets-and attached to one of said cross strips of a respective one of said cover sheets, each of said attachment clips being shaped to extend around and engage with said aft edge of said respective one aircraft wing to anchor an aft edge of said respective cover sheet at said aft edge of said respective aircraft wing so as to prevent said cover sheets from sliding forward on said respective aircraft wings.

13. The system of claim 12 further comprising:

(e) a pocket formed at one end of said cover sheet, said pocket being adapted to extend over and enclose a tip of the aircraft wing.

14. The system of claim 12 wherein said connecting means includes a plurality of fuselage straps connected at corners of each of said cover sheets which abut said aircraft fuselage and being adapted to extend under said aircraft fuselage, said fuselage straps having attachment means for securing said fuselage straps being attached to one of said cover sheets to said fuselage straps being attached to the other of said cover sheets on the opposite side of said aircraft.

15. The system of claim 14 wherein said connecting means further includes a plurality of wing straps connected at selected locations along said perimeter of said cover sheet to said perimeter strips and extending therefrom, said wing straps having attachment means for securing said cover sheet via said wing straps to portions of said aircraft wing.

16. The system of claim 15 wherein said attachment means of said fuselage straps and said wing straps includes a plurality of quick-release buckles attached thereto.

17. The system of claim 15 wherein said perimeter strips, cross strips, fuselage straps and wing straps are made from a nylon webbing material.

18. The system of claim 12 wherein said cover sheet is made from a urethane coated polyester material.

* * * * *